(12) United States Patent
Yang

(10) Patent No.: US 7,029,158 B2
(45) Date of Patent: Apr. 18, 2006

(54) HOLLOW BACKLIGHT MODULE

(76) Inventor: Pang-Lun Yang, 3F-2, No.2, Lane 71, Szu Wei Road, Wu Chi Chen, Taichung Hsien (TW)

( * ) Notice: Subject to any disclaimer, the term of this patent is extended or adjusted under 35 U.S.C. 154(b) by 101 days.

(21) Appl. No.: 10/747,354

(22) Filed: Dec. 29, 2003
(Under 37 CFR 1.47)

(65) Prior Publication Data
US 2004/0156184 A1  Aug. 12, 2004

(30) Foreign Application Priority Data
Feb. 12, 2003  (TW) .............................. 92102919 A

(51) Int. Cl.
  *G01D 11/28*  (2006.01)
(52) U.S. Cl. ...................... 362/600; 362/616; 362/615; 362/613; 362/622
(58) Field of Classification Search .................. 349/65; 385/146, 901; 359/62, 443; 362/627, 622, 362/618, 615, 613, 610, 7, 607, 606, 602, 362/628, 600
See application file for complete search history.

(56) References Cited

U.S. PATENT DOCUMENTS

| | | | |
|---|---|---|---|
| 5,704,703 A * | 1/1998 | Yamada et al. ............... 362/27 |
| 6,024,452 A * | 2/2000 | Vanderwerf et al. .......... 353/38 |
| 6,340,232 B1 * | 1/2002 | Knoll et al. .................. 362/26 |
| 6,443,585 B1 * | 9/2002 | Saccomanno ............... 362/608 |
| 6,631,031 B1 * | 10/2003 | Lee et al. .................... 359/487 |
| 2003/0227768 A1 * | 12/2003 | Hara et al. .................... 362/31 |
| 2004/0047585 A1 * | 3/2004 | Duong ........................ 385/146 |

* cited by examiner

Primary Examiner—Sandra O'Shea
Assistant Examiner—Anabel Ton
(74) Attorney, Agent, or Firm—Ladas & Parry LLP

(57) ABSTRACT

A hollow backlight module includes a first light guide plate, a second light guide plate, two light sources, a reflecting plate and a diffusing film. The first light guide plate and the second light guide plate form a hollow light-guiding zone therebetween. The two light sources are located respectively at two sides of the hollow light-guiding zone. The reflecting plate is located between the outer surface of the second light guide plate. The diffusing film is located above the outer surface of the first light guide plate. Lights emitted from the light sources first enter the hollow light-guiding zone and then into the first and the second light guide plates. The reflecting plate reflects the lights back to the hollow light-guiding zone. The diffusing film diffuses the light projected from the first light guide plate and outputs uniform lights.

10 Claims, 2 Drawing Sheets

HOLLOW BACKLIGHT MODULE

FIELD OF THE INVENTION

The present invention relates to a backlight module for liquid crystal displays (LCDs) and particularly to a hollow backlight module.

BACKGROUND OF THE INVENTION

With rapid advance of manufacturing technologies in thin film transistor LCD (TFT-LCD), and the advantages of slim and light, power saving and low radiation, LCDs have been widely used in various types of electronic products such as personal digital assistant (PDA), notebook computers, digital cameras, video cameras, mobile phones, and the like. In addition, the industry has invested heavily in research and development and uses mass production facilities. As a result, quality of LCD continuously improves and the price drops relentlessly, application scope of LCD is expanded drastically. However LCD cannot generate light by itself. It requires a backlight module to accomplish display function.

Refer to FIG. 1 for the cross-sectional view of a conventional backlight module. The backlight module 10 is generally designed for a large size LCD. It includes a diffusing plate 11, a plurality of lamp tubes 12, a reflecting plate 13, a frame 14 and a plurality of films 15. The diffusing plate 11 is a semi-transparent acrylic plate which has a light incident surface (lower surface), a light exit surface (upper surface), and a plurality of diffusion granules located therein (not shown in the drawing) for diffusing lights. The lamp tubes 12 are evenly located below the light incident surface of the diffusing film 11. The reflecting plate 13 is located under the lamp tubes 12. A major portion of lights emitted from the lamp tubes 12 directly enters the diffusing plate 11, and the rest portion of the lights are reflected by the reflecting plate 13 and then enter the diffusing plate 11. The frame 14 encases the diffusing plate 11, the lamp tubes 12, and the reflecting plate 13 so as to protect the elements located in the backlight module 10. Several optical films 15 are further located above the diffusing plate 11 to output lights in a uniform fashion.

In the conventional backlight module, all lamp tubes are positioned under the diffusing plate. The diffusing plate usually has a thickness between 2 and 4 mm, the light path from an incident surface to an exit surface is too short. In addition, the scatting times of light scattering by the diffusion granules in the diffusing plate is limited. As a result, the diffusing plate cannot contribute uniform lights. Moreover, the lamp tubes are packed inside the backlight module in the conventional display so the heat dissipation of the backlight module becomes poor. Heat generated by the lamp tubes tends to accumulate inside the backlight module and transmits through the diffusing plate to the LCD located thereabove. Liquid crystals in the LCD are then affected. Furthermore, the diffusing plate has a higher shielding ratio which reduces luminous flux. This also affects the brightness of the backlight module and the quality of the LCD.

Therefore to overcome the disadvantages occurred to the conventional backlight modules and to improve the backlight module to achieve more uniform lighting, greater luminous flux and improved heat dissipation so that yields and quality of the LCD can be improved is a goal hotly pursued in the industry.

SUMMARY OF THE INVENTION

The primary object of the invention is to provide a hollow backlight module to generate more uniform light output to enhance visual quality of LCD.

Another object of the invention is to provide a hollow backlight module to increase luminous flux of light in the backlight module to increase the brightness of light output of the backlight module.

A further object of the invention is to provide a hollow backlight module to increase heat-dissipation efficiency of the backlight module.

The hollow backlight module according to the invention includes a first light guide plate, a second light guide plate, two light sources, a reflecting plate and a diffusing film.

The first light guide plate is made from transparent acrylic and includes a first inner surface and a first outer surface, each of which is formed respectively with an inner concave curvature. The diffusing film is located above the first outer surface. The first inner surface has a plurality of diffusion patterns thereon. The second light guide plate also is made from transparent acrylic and has a second inner surface and a second outer surface. A hollow light-guiding zone is formed between the first light guide plate and the second light guide plate. The two light sources are located at two sides of the hollow light-guiding zone. The second inner surface has an inner concave curvature. The second outer surface has a plurality of diffusion patterns thereon. The reflecting plate is located under the second light guide plate.

Each light source has one or more lamp tubes and a reflective lamp cover. Lights emitted from the light sources first enter the hollow light-guiding zone and then transmit into the first light guide plate and the second light guide plate. When lights enter the second light guide plate, lights are diffused by the concave second inner surface and the diffusion patterns on the second outer surface of the second light guide plate, and then are reflected by the reflecting plate back to the hollow light-guiding zone. When lights enter the first light guide plate, lights are diffused by the diffusion patterns formed on the first inner surface and the concave surface, and is further diffused by the inner concave surface of the first outer surface and the diffusing film. Finally, the backlight module outputs uniform lights required by the LCD to display images. The light sources are extended out of the first light guide plate and the second light guide plate, the heat of lamp tubes will not be accumulated inside the backlight module so that the heat-dissipation efficiency is increased.

The foregoing, as well as additional objects, features and advantages of the invention will be more readily apparent from the following detailed description, which proceeds with reference to the accompanying drawings.

DESCRIPTION OF THE PREFERRED EMBODIMENT

The invention discloses a hollow backlight module to output uniform lights, obtain a greater luminous flux, and achieve improved heat-dissipation. A preferred embodiment and its details are discussed as follows.

Figure 1:
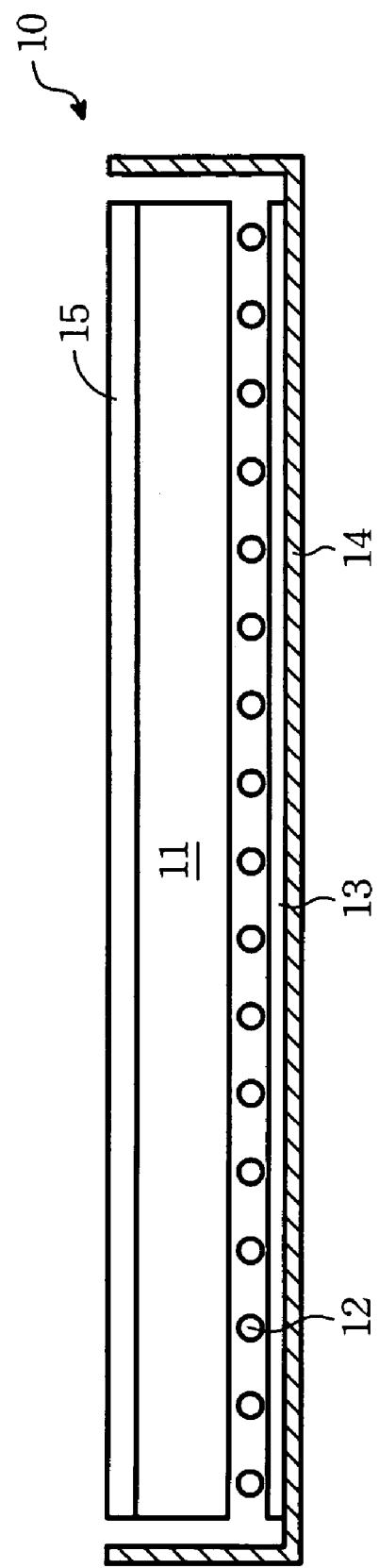
FIG. 1 is a sectional view of a conventional direct backlight module.
Figure 2:
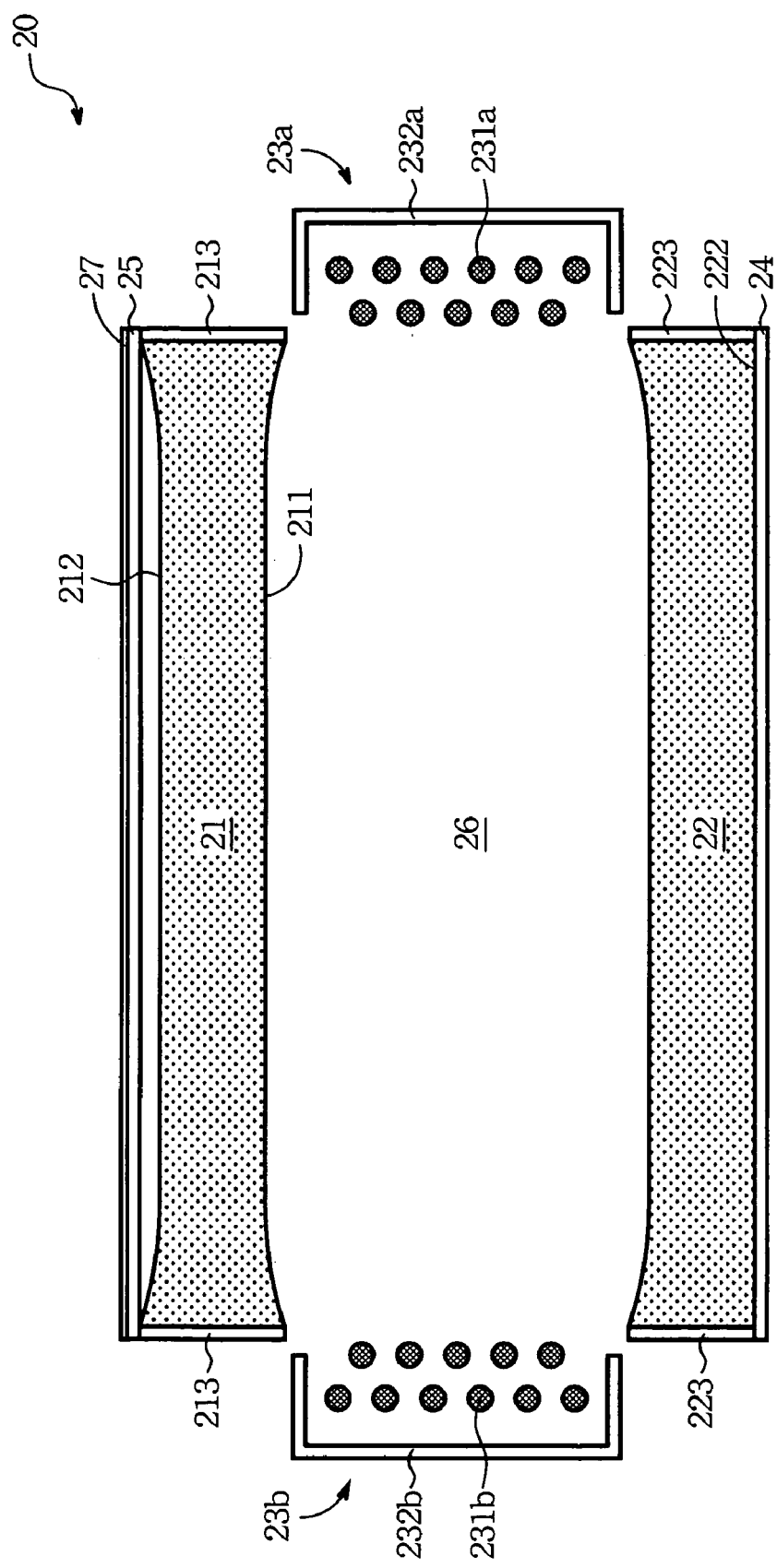
FIG. 2 is a schematic view of the hollow backlight module of the invention.

Referring to FIG. 2, the hollow backlight module 20 includes a first light guide plate 21, a second light guide plate 22, two light sources 23, a reflecting plate 24 and a diffusing film 25.

The first light guide plate 21 is usually made of transparent acrylic. The first light guide plate has a first inner surface 211 and a first outer surface 212, each of which is formed respectively with an inner concave curvature. The purpose of the concave curvature is to make the first light guide plate 21 to have a diffusion effect like a concave lens. In addition, the sides of the first light guide plate 21 are adhered to a reflective tape 213 to prevent light leakage and increase light utilization efficiency. The diffusing film 25 is made of acrylic and located above the first light guide plate 21. Moreover, the first inner surface 211 of the first light guide plate 21 has a plurality of diffusion patterns (not shown in the drawing) thereon. The diffusion patterns may be V-shaped grooves or U-shaped grooves.

The second light guide plate 22 is made of transparent acrylic, and has a second inner surface 221 and a second outer surface 222. The second inner surface 221 is formed with an inner concave curvature. The second outer surface 222 has a plurality of diffusion patterns (not shown in the drawing) thereon that have the shapes and functions equivalent to the diffusion patterns on the first light guide plate 21. Similarly, the sides of the second light guide plate 22 are adhered to a reflective tape 223 to prevent light leakage and increase light utilization efficiency. A hollow light-guiding zone 26 is formed between the second light guide plate 22 and the first light guide plate 21.

The two light sources 23 are located respectively on two sides of the hollow light-guiding zone 26. Each light source can include one or more lamp tubes. In this embodiment, each light source 23 includes a plurality of lamp tubes 231 and a reflective lamp cover 232. The lamp tubes 231 and the lamp cover 232 are extended out of the backlight module 20. Lights generated by the lamp tubes 231 transmit into the hollow light-guiding zone 26 from the two sides of the hollow light-guiding zone 26. The reflecting plate 24 is made of aluminum or an aluminum alloy, and is located below the second outer surface 222 of the second light guide plate 22. The diffusing film 25 located above the first light guide plate 21 is used to diffuse lights. The surface of the diffusing film 25 may further be coated with a fluorescent paint 27 to temporarily retain the incident lights for a predetermined time period before emission to improve the uniformity of output lights.

The hollow backlight module set forth above has the following advantages.
1. The hollow light-guiding zone between the two light guide plates contains air as the main medium which has a low shielding ratio and high luminous flux. It enables the backlight module to provide lights with greater brightness.
2. The first light guide plate and the second light guide plate have inner concave curvatures similar to a concave lens to generate diffusion effect thereby can produce more uniform output lights.
3. The light sources are located on two sides of the backlight module. The lamp tubes and the reflective lamp covers are extended out of the backlight module. Thus, thermal energy generated by the lamp tubes can be directly released from two sides of the backlight module, the heat of lamp tubes will not be accumulated inside the backlight module so that the heat-dissipation efficiency is increased.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A hollow backlight module, comprising:
a first light guide plate having a first inner surface and a first outer surface;
a second light guide plate having a second inner surface and a second outer surface, the first and second inner surfaces being inner concave curvature surfaces, and the second light guide plate and the first light guide plate forming a hollow light-guiding zone therebetween;
two light sources located at two sides of the hollow light-guiding zone, light from the two light sources transmitting into the hollow light-guiding zone, and then entering the first and the second light guide plates through the first and the second inner surfaces;
a reflecting plate located below the second outer surface of the second light guide plate to reflect the light emitting from the second light guide plate to the second light guide plate and to enter again into the hollow light-guiding zone; and
a diffusing film located above the first outer surface of the first light guide plate for diffusing the light emitting from the first light guide plate and producing uniform light output.

2. The hollow backlight module of claim 1, wherein the first light guide plate and the second light guide plate are made from transparent acrylic.

3. The hollow backlight module of claim 1, wherein the first outer surface of the first light guide plate has an inner concave curvature.

4. The hollow backlight module of claim 1, wherein the first inner surface of the first light guide plate has a plurality of diffusion patterns thereon.

5. The hollow backlight module of claim 1, wherein the second outer surface of the second light guide plate has a plurality of diffusion patterns thereon.

6. The hollow backlight module of claim 1, wherein a reflective tape is formed on one of the first light guide plate and the second light guide plate to prevent a light leakage.

7. The hollow backlight module of claim 1, wherein the reflecting plate is made of aluminum or an aluminum alloy.

8. The hollow backlight module of claim 1, wherein the diffusing film is coated with a fluorescent paint to retain the entering light for a predetermined time period before emitting light.

9. The hollow backlight module of claim 1, wherein each of the light sources includes a plurality of lamp tubes and a reflective lamp cover.

10. The hollow backlight module of claim 9, wherein each reflective lamp cover and the lamp tubes are substantially extended out of the first light guide plate and the second light guide plate so that light from the lamp tubes first enters the hollow light guiding zone from the two sides thereof and then enters the first and the second light guide plates.

* * * * *